United States Patent
Bhargava et al.

(10) Patent No.: US 10,924,327 B2
(45) Date of Patent: *Feb. 16, 2021

(54) AUTONOMOUS SERVER AGENTS

(71) Applicant: JumpCloud, Inc., Louisville, CO (US)

(72) Inventors: Rajat Bhargava, Boulder, CO (US);
James Brown, Boulder, CO (US);
Christopher Marie, Boulder, CO (US)

(73) Assignee: JumpCloud, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,267

(22) Filed: Mar. 26, 2020

(65) Prior Publication Data
US 2020/0228390 A1 Jul. 16, 2020

Related U.S. Application Data

(63) Continuation of application No. 16/363,240, filed on Mar. 25, 2019, now Pat. No. 10,644,930, which is a continuation of application No. 14/728,708, filed on Jun. 2, 2015, now Pat. No. 10,257,017.

(60) Provisional application No. 62/011,087, filed on Jun. 12, 2014, provisional application No. 62/007,278, filed on Jun. 3, 2014, provisional application No. 62/007,281, filed on Jun. 3, 2014, provisional application No. 62/007,285, filed on Jun. 3, 2014.

(51) Int. Cl.
H04L 12/24 (2006.01)
H04L 29/06 (2006.01)

(52) U.S. Cl.
CPC ............ *H04L 41/046* (2013.01); *H04L 41/28* (2013.01); *H04L 63/04* (2013.01); *H04L 63/166* (2013.01)

(58) Field of Classification Search
CPC ....... H04L 41/046; H04L 63/04; H04L 41/28; H04L 63/166
USPC .............................................. 726/22; 709/202
See application file for complete search history.

(56) References Cited

U.S. PATENT DOCUMENTS

| | | | |
|---|---|---|---|
| 6,519,552 B1 * | 2/2003 | Sampath | G05B 23/0254 702/183 |
| 7,058,968 B2 * | 6/2006 | Rowland | H04L 63/102 713/168 |
| 2014/0164776 A1 * | 6/2014 | Hook | G06F 21/6218 713/171 |

* cited by examiner

Primary Examiner — Kambiz Zand
Assistant Examiner — Benjamin A Kaplan
(74) Attorney, Agent, or Firm — Holland & Hart LLP

(57) ABSTRACT

Methods, systems, and devices are described for orchestrating server management in a modern IT network. The described techniques may be implemented to manage any number of networked severs, whether local, remote, or both. Server orchestration may leverage a central, cloud-based management system and/or one or more autonomous agents installed on servers with the network. The autonomous agents may each be registered with the supervisory server and may have awareness of one another.

20 Claims, 9 Drawing Sheets

AUTONOMOUS SERVER AGENTS

CROSS REFERENCES

The present Application for Patent is a continuation of U.S. patent application Ser. No. 16/363,240 by Bhargava et al., entitled "AUTONOMOUS SERVER AGENTS," filed Mar. 25, 2019, which is a continuation of U.S. patent application Ser. No. 14/728,708 by Bhargava et al., entitled "AUTONOMOUS SERVER AGENTS," filed Jun. 2, 2015, which claims the benefit of U.S. Provisional Patent Application No. 62/011,087 by Bhargava et al., entitled "PROCESS LEVEL MONITORING," filed Jun. 12, 2014; U.S. Provisional Patent Application No. 62/007,278 by Bhargava et al., entitled "AUTONOMOUS SERVER AGENTS," filed Jun. 3, 2014; U.S. Provisional Patent Application No. 62/007,281 by Bhargava et al., entitled "ORCHESTRATED SERVER MANAGEMENT," filed Jun. 3, 2014; and U.S. Provisional Patent Application No. 62/007,285 by Bhargava et al., entitled "SERVER SCRIPT MARKETPLACE," filed Jun. 3, 2014. Each of these applications is assigned to the assignee hereof and expressly incorporated by reference in its entirety herein.

BACKGROUND

Servers are widely employed for hosting, storing, and distributing software applications, business documents, entertainment files (e.g., audio and video files), and webpages. Modern information technology (IT) infrastructures often involve numerous, remotely located, distributed servers. A single enterprise may utilize servers located on premise, within remote data centers, and/or hosted in "the cloud." Consequently, managing IT infrastructure has become time consuming, labor intensive, and tedious. IT networks tend to be constantly changing as new servers are brought online and old servers are decommissioned.

A single network may utilize servers having disparate operating systems, which may create a patchwork of management needs. Different servers may be more or less vulnerable to constantly changing security threats depending upon how each is configured. Redundant, incongruous, or legacy server management programs (e.g., scripts) may reside on different servers within the network. Additionally, scheduling tasks on any one server may be difficult, and scheduling individual tasks that utilize multiple servers may be cost-prohibitive or unreliable. Accordingly, there is a need for a server management system that accounts for the distributed nature of modern IT networks. It may therefore be beneficial to provide management tools that allow for ease of access to multiple servers, limit repetitive tasks, execute tasks across various portions of or an entire IT network, allow scripts to be written in a common language, and/or to increase reliability of IT networks.

SUMMARY

Methods, systems, and devices are described for orchestrating server management in a modern IT network. The described techniques may be implemented to manage any number of networked severs, whether local, remote, or both. Server orchestration may leverage a central, cloud-based management system and/or a series of autonomous agents deployed on each server. A central management system may allow rapid and efficient distribution and installation of scripts and execution of tasks on various servers throughout a network. The central management system may also facilitate exchanges of scripts among and between various networks and users. The central management system, in conjunction with the autonomous agents may identify and respond to security threats within the network.

A method for server management is described. The method includes installing an autonomous agent on a subservient server, registering a unique identifier of the autonomous agent with a supervisory server, and establishing a secure communication mechanism between the autonomous agent and the supervisory server. The method may further include registering an initial server management task at the autonomous agent, and the method may involve executing the initial server management task on the subservient server with the autonomous agent, irrespective of connectivity between the autonomous agent and the supervisory server.

In other examples, systems, apparatuses, and computer-readable media may include processors, modules, means for, and/or processor-executable instructions for implementing the described methods.

Further scope of the applicability of the described methods, systems, and devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
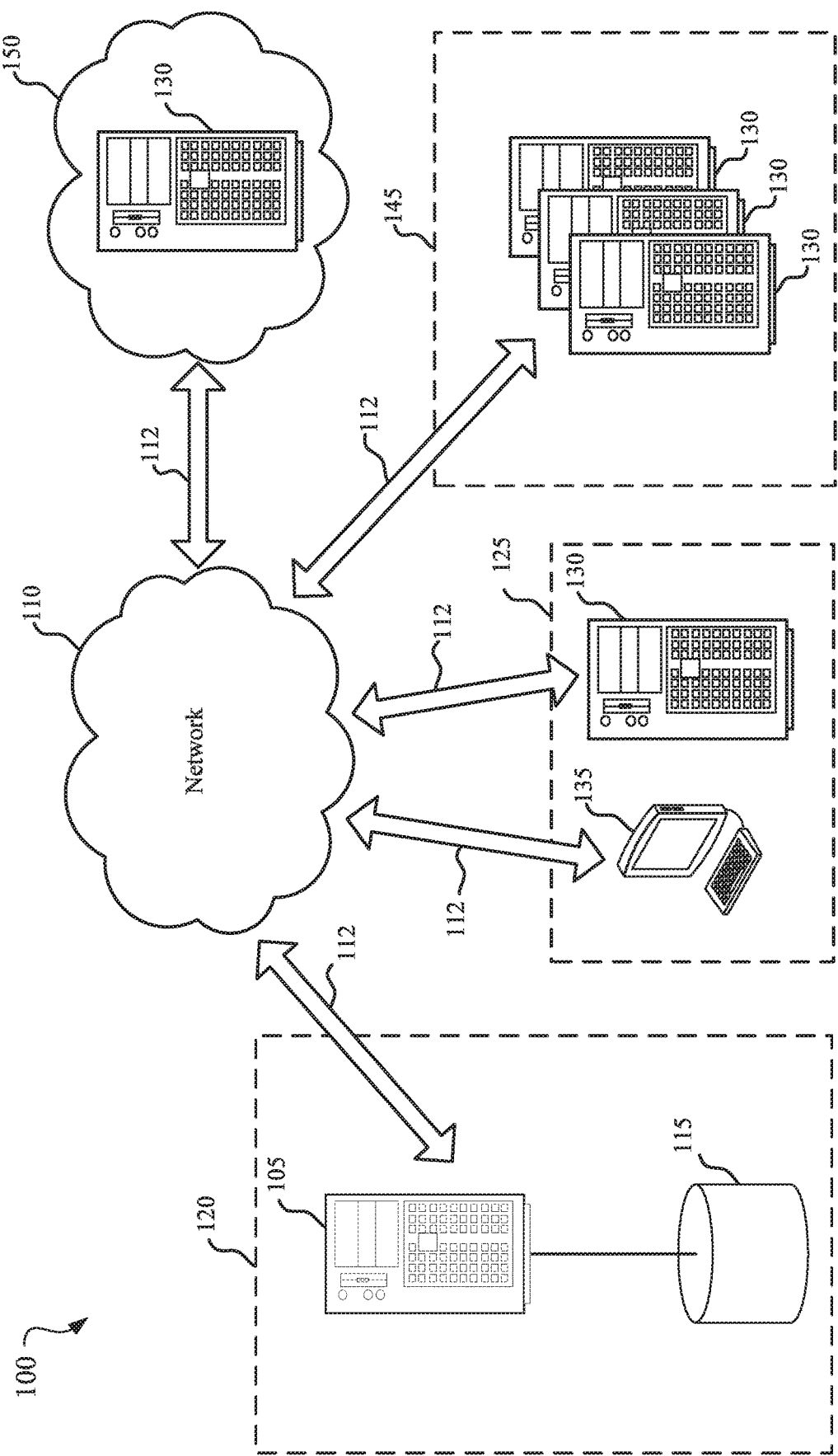
FIGS. 1A and 1B illustrate an example or examples of a network that supports server orchestration and autonomous server agents in accordance with the present disclosure.

The following provides examples, and is not intended to limit the scope, applicability or configuration of the invention. Rather, the ensuing description will provide those skilled in the art with an enabling description for implementing embodiments of the invention. Various changes may be made in the function and arrangement of elements A central management system may be leveraged to orchestrate tasks within a distributed server (e.g., computing) network. This server orchestration may leverage a cloud-based system. For example, a supervisory server or node may be connected to any number of servers or nodes within a network via the internet or an intranet, and the supervisory server or node may be accessed or controlled via the internet or an intranet. Agents deployed on each server may securely communicate via a two-way channel with the supervisory server. The central management system may thus allow a user to direct, via the supervisory server, the agents to execute server tasks.

The agents may operate with autonomy. The agents may thus execute any task that they have been directed to perform, and they may execute tasks autonomously in the event that a connection with the supervisory server is lost. Server tasks may be created and saved within the supervisory server. These tasks can be run on a scheduled or ad hoc basis by any or all agents within the network. In some examples, tasks may be triggered by events or actions taken by agents or third-party applications. Such triggering events may be pre-registered with the agents and/or the central management system. Agents may communicate with one another such that tasks scheduled across multiple servers may be executed with little or no input from a system administrator. Agents may be directed to execute tasks with scripts—e.g., computer- or processor-executable program code created for discrete tasks The central management system may allow users to enable scripts to be executed across a server infrastructure. Scripts can be executed immediately or scheduled for execution later. Users may specify on which servers within a network scripts should be executed—e.g., scripts may be executed on one, several, or all servers within a network— irrespective of the operating system of a particular server. The central management system may also facilitate script sharing and exchange between system users. Scripts developed by one user for one enterprise may be bought, sold, or traded to another user for another enterprise.

In some cases, the central management server also identifies and detects compromised servers with process-level egress monitoring techniques. The supervisory server and the autonomous agents may be utilized to recognize whether various server processes are behaving as expected, and quickly respond to identified threats when unexpected process behavior is identified. The central management server may also identify attacks utilizing file monitoring, denial of server (DOS) detection, and the like.

Various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following methods, systems, devices, and software may individually or collectively be components of a larger system, wherein other procedures may take precedence over or otherwise modify their application.

Referring first to FIG. 1A, a block diagram illustrates a central server management system 100 in accordance with various embodiments. The system 100 includes a supervisory server 105 in communication with a network 110 via a communication link 112. The network may represent the internet or an intranet, such as a proprietary enterprise network. The communication links 112 may be wired or wireless connections, and they may include one or several protocols used for secure communications. For example, a communication link 112 may utilize Transport Layer Security (TLS), Secure Sockets Layer (SSL), and/or some other security or encryption protocol.

In some embodiments, the supervisory server 105 is in communication with a data store 115, which may be local or remote. The data store 115 may store or host various content, scripts, tasks, event logs, and/or user data necessary or helpful in orchestrating server management. The supervisory server 105 and the data store 115 may share a common physical location 120. In some cases, users access the supervisory server 105 via the network 110, such that the location 120 may be referred to by those skilled in the art as "cloud-based."

A user may access the supervisory server 105 from a location 125 which may be physically remote from the location 120 of the supervisory server 105. For example, the user may access the supervisory server 105 to manage a subservient server 130 utilizing a console 135. The subservient server 130 may be equipped with an autonomous agent, which may be in communication with the supervisory server 105. The console 135 and the subservient server 130 may share a common physical location 125. In some embodiments, the console 135 and the subservient server 130 are located on a particular enterprise's premise.

The user may also access and utilize the supervisory server 105 to manage subservient servers 130 that are physically remote from the user's enterprise. For example, the user may access subservient servers 130 housed within a data center 145. Additionally or alternatively, the user may utilize the supervisory server 105 to manage other subservient servers 130 located in the cloud 150. For example, those skilled in the art will recognize that cloud-based servers may include third-party owned servers having space leased by the user's enterprise. These may include, for instance, cloud-based services such as Amazon Web Services, SoftLayer, and the like. The subservient servers 130 may be equipped with an autonomous agent, which may be in communication with the supervisory server 105.

As used herein, the term server refers to a computer or program in a network that provides services, including access to applications, files, peripherals, etc., to other computers or programs and/or consoles within a network. As discussed below, this may include both software and hardware, and real and virtual machines. In some embodiments, a server is a computer program that operates to support or perform tasks on behalf of other programs, computers, and/or users. Further, as used herein, a server may include a "rack" or enclosure housing computer hardware and software.

Figure 1B:
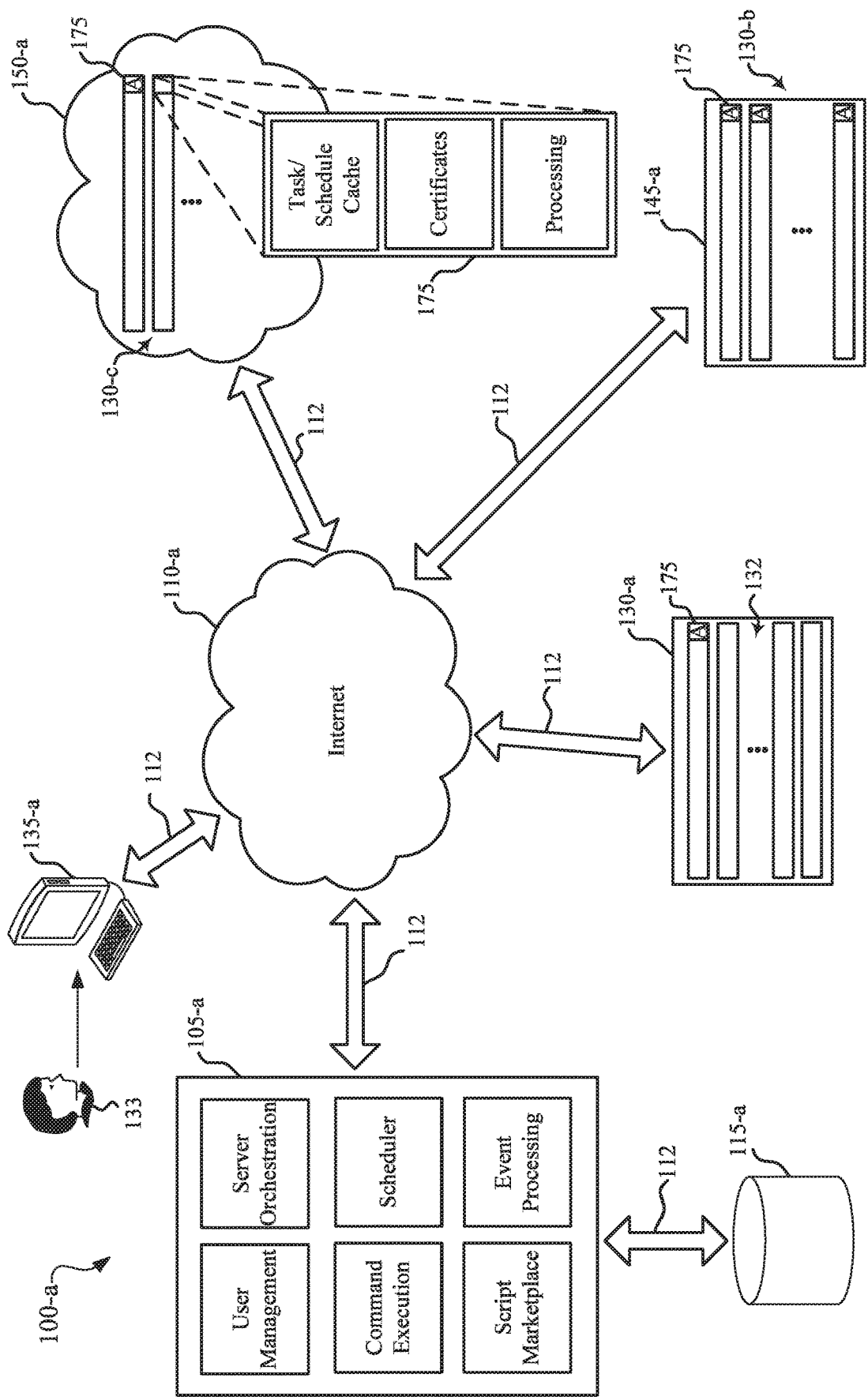

FIG. 1B illustrates a central management system 100-*a*, which may be an example of the system 100 described with reference to FIG. 1A. The system 100-*a* may be a cloud-based central management system, with a supervisory server (or node) 105-*a* connected to the internet 110-*a* via a communication link 112. In some embodiments, the communication links 112 are made utilizing TLS. The supervisory server 105-*a* may be in communication with a data store 115-*a*. The supervisory server 105-*a* and/or the data store 115-*a* may include a number of modules for orchestrating or managing various aspects of the system 100-*a*. For example, the supervisory server 105-*a* may include modules for user management, server orchestration, command execution, scheduling, a script marketplace, and/or event processing.

These modules may be hardware or software modules, and may implement the functions described in detail below.

The system 100-a includes a number of subservient servers 130. For example, the system 100-a may include a subservient server 130-a, which may be configured with virtual machines 132, and which may be located on premises with a user 133 (and a user console 135-a) of the system 100-a. As used herein, the term virtual machine means a software emulation of physical computer, which may appear to a user and function as a physical computer or server. In some embodiments, the system 100-a includes subservient servers 130-b housed in a data center (or data centers) 145-a. Additionally or alternatively, the system 100-a may include cloud-based subservient servers 130-c, which may be owned by a third party at a remote physical location 150-a (e.g., "in the cloud"). The user 133 may access the supervisory server 105-a via the console 135-a and the internet 110-a and utilize the supervisory server 105-a to orchestrate management of the subservient servers 130. For instance, some or all of the subservient servers 130 may be equipped with an autonomous agent 175.

In some embodiments, an autonomous agent 175 is a software module (e.g., computer- or processor-executable code) that is configured to run certain software on a subservient server 130. The autonomous agent 175 may be equipped with various submodules, including those for caching tasks or schedules, storing and/or registering user encryption certificates, and/or processing and executing commands. In some embodiments, the autonomous agents 175 are capable of executing any number of commands or tasks. For example, the autonomous agents 175 may perform server functions related to user management, disk space management, log monitoring, changing system configurations, sending and receiving emails, and/or identifying and neutralizing security threats. The various features of the agents and its submodules are described in further detail below.

Server tasks may be created by a user 133 to execute in the system 100-a. The tasks may include virtually any commands run known by those skilled in the art to run on a server. Additionally or alternatively, such commands may be combined into scripts (as described above) and executed by an autonomous agent 175. Tasks may be "chained" together, with one task acting as a predicate for a subsequent task—e.g., the completion of one task at one server may trigger a subsequent task at another server. Additionally or alternatively, tasks may be initiated or run in parallel or in combination. In some examples, complex operations may be carried out by utilizing multiple concurrent tasks as predicate tasks for one or more subsequent tasks. In other examples, one task may be a predicate for several subsequent tasks. In still other examples, a particular combination of tasks may be a predicate for one or more subsequent tasks or combinations of tasks.

The autonomous agents 175 may be capable of executing any arbitrary command that the operating system of the underlying subservient server 130 supports. An autonomous agent 175 may thus be able to execute previously unregistered tasks without the necessity of being upgraded. For example, a user 133 may simply write a new script or execute new commands via the supervisory server 105-a to utilize the agent's functionality.

In some embodiments, tasks are passed (e.g., transmitted) from the supervisory server 105-a to an autonomous agent 175, where the task is registered. Once the autonomous agent 175 has registered or accepted the task, the agent 175 may operate autonomously. For example, if the agent loses connection to the supervisory server 105-a, the agent 175 may nonetheless execute tasks scheduled in the agent's 175 queue.

Autonomous agents 175 may also operate with awareness of tasks scheduled on and/or performed by other agents 175. For example, actions of one agent 175 may cause another agent 175 to trigger a script or command based on the results from first agent 175. In some embodiments, one agent's 175 task can only be completed if another agent's 175 task has been successfully completed. In this way, a sophisticated sequence of commands or scripts may be executed throughout the system 100-a. Because each of the subservient servers 130 may be connected via the internet 110-a, the various autonomous agents 175 may be in communication with one another (in addition to being in communication with the supervisory server 105-a) via communication links 112.

Figure 2:
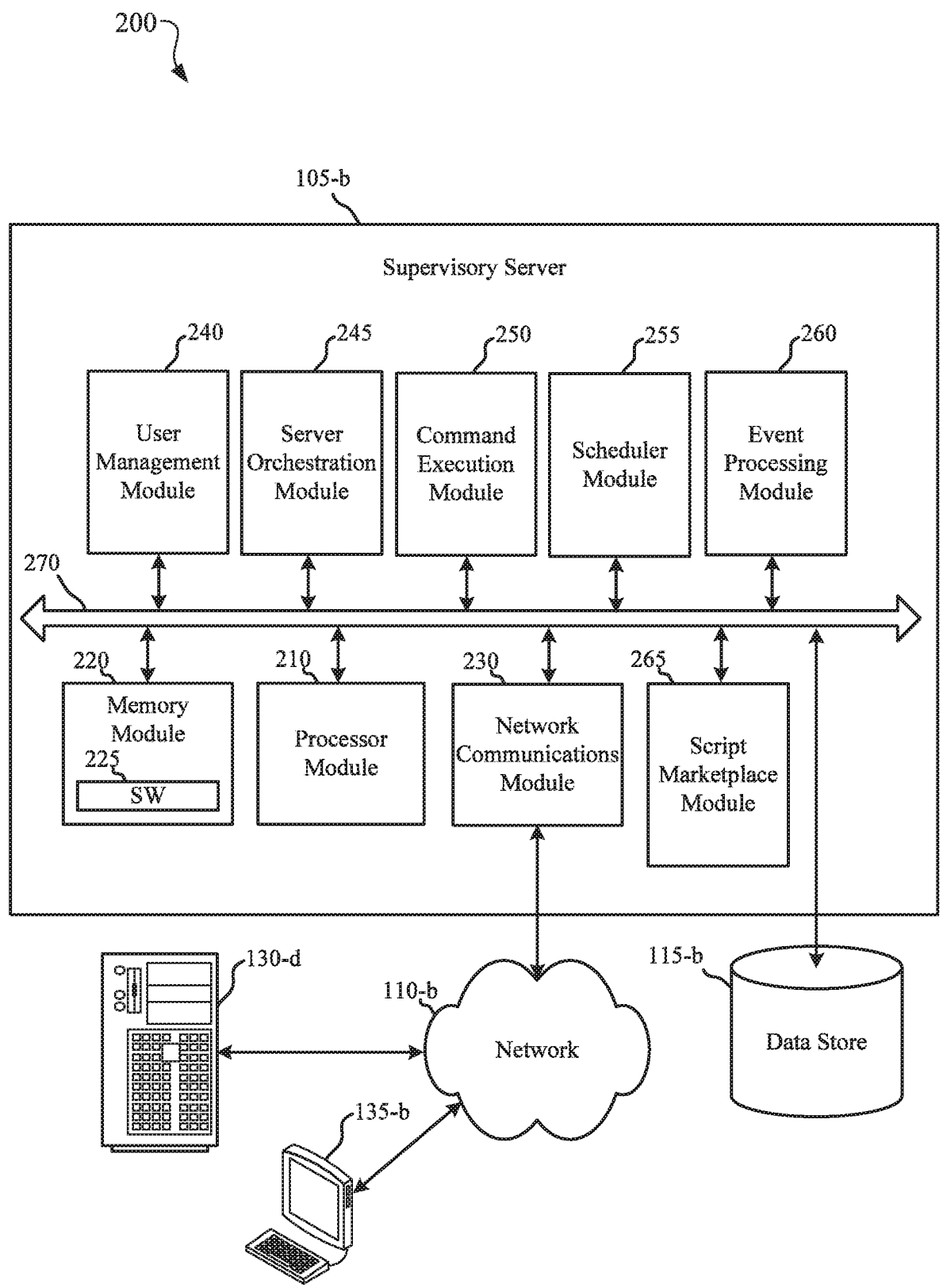
FIG. 2 illustrates an example system that supports server orchestration and autonomous server agents in accordance with the present disclosure.

Next, FIG. 2 shows a system 200 configured for central server management in accordance with various embodiments. The system 200 may be an example of the systems 100 and 100-a described with reference to FIGS. 1A and 1B. The system 200 includes a supervisory server 105-b in communication with a network 110-b. In some embodiments, the system 200 may include a data store 115-b. The supervisory sever 105-b may be in communication, via the network 110-b, with a subservient server 130-b and a user console 135-b.

The supervisory server 105-b may include a processor module 210, a memory module 220 (including software/firmware (SW) 225), a network communications module 230, a user management module 240, a server orchestration module 245, a command execution module 250, a scheduler module 255, an event processing module 260, and/or a script marketplace module 265. The various modules of the supervisory server 105-b may be in communication via one or more buses 270.

The network communications module 230 may be configured for secure, bi-directional communication with the network 110-b via one or more wired or wireless links. For example, the network communications module 230 may include a modem configured to modulate packets and transmit them to the network 110-b, and to demodulate packets received from the network 110-b. In some embodiments, the network communications module 230 includes a transceiver and antennas.

The memory module 220 may include random access memory (RAM) or read-only memory (ROM) or both. The memory module 220 may store computer-readable, computer-executable software/firmware code 225 containing instructions that are configured to, when executed, cause the processor module 210 to perform various functions described herein (e.g., orchestrating server management tasks, communicating with autonomous agents, identifying and responding to security threats, managing exchanges within a script marketplace, etc.). In other examples, the software/firmware 225 is not directly executable by the processor module 210, but is configured to cause a computer (e.g., when compiled and executed) to perform the functions described herein. The processor module 210 may include an intelligent hardware device, e.g., a central processing unit (CPU), a microcontroller, an application-specific integrated circuit (ASIC), or the like. The various functions of the modules of the supervisory server 105-b, described below, may be implemented as an aspect of the processor module 210 or as processor-executable instructions stored on the memory 220.

The user management module 240 may be configured to facilitate user access to the system 200. For example, the user management module 240 may store user credentials and/or user preferences. Additionally or alternatively, the user management module 240 maintains records of various scripts available to a particular user. For example, a user may seek to develop, acquire, and/or deploy a script for a particular server task. The user management module 240 may be configured to store and retrieve scripts from the data store 115-b and to communicate with other modules of the supervisory server 105-b to deploy scripts to an autonomous agent on the subservient server 130-d. In some embodiments, the user management module 240 is also configured to maintain or access user preferences, users' network data, and/or the locations of a user's subservient servers 130.

The server orchestration module 245 may be configured to manage and schedule server tasks on subservient servers 130. In some embodiments, a user may direct the server orchestration module to execute tasks throughout the system 200 according to certain constraints or triggering actions. For example, the server orchestration module may be configured to execute tasks with autonomous agents on an ad hoc basis when initiated by a user, according to a schedule, or upon a triggering action (e.g., when a predicate task is completed within the network). The server orchestration module 245 may also be configured to, in conjunction with other modules, push scripts or tasks to autonomous agents, including an autonomous agent deployed on subservient server 130-d. Individual server tasks may be combined into sequences, which may be finite or infinite in number. In some cases, sequences of tasks are dependent on a completion of a predicate task. In any case, the server orchestration module 245 may coordinate the execution of such sequences.

In some embodiments, the command execution module 250 is configured to execute commands, via autonomous agents, on subservient servers 130 upon the direction of the server orchestration module 245. Additionally or alternatively, the command execution module 250 may be configured to execute commands upon the direction of a user, which may include receiving commands and/or instruction from the user console 135-b via the network 110-b. The command execution module 250 may also be configured to execute commands according to a schedule, which may be provided by the scheduler module 255.

The scheduler module 255 may be configured to, upon user instruction, schedule tasks at or among autonomous agents. In some embodiments, the scheduler module 255 may maintain or create logs of the various task to be executed within a network 110-b, and it may report and/or record such logs. For example, the scheduler module 255 may be configured to monitor and, in conjunction with the server orchestration module 245 and the command execution module 250, direct server tasks at subservient servers 130 based on user-defined parameters and/or according to certain scripts.

In some embodiments, the event processing module 260 is configured to identify an expected process behavior and identify when an actual process behavior deviates from the expected behavior. The event processing module 260 may be configured to halt or schedule particular server tasks based on determined process behavior. For instance, the event processing module 260 may be configured to operate in conjunction with the server orchestration module 245 to reschedule and/or reallocate resources of subservient servers 130 based on certain process behaviors.

In still further embodiments, the script marketplace module 265 is configured to facilitate script exchanges between users. The script marketplace module 265 may be configured to manage or host a web-based portal in which users may buy, sell, and/or trade scripts or other server management tools and techniques. In some cases, the script marketplace module 265 is configured to maintain user data or to access such data in the data store 115-b. User data may include user-generated or user-owned scripts, user preferences, user server locations, etc.

Figure 3A:
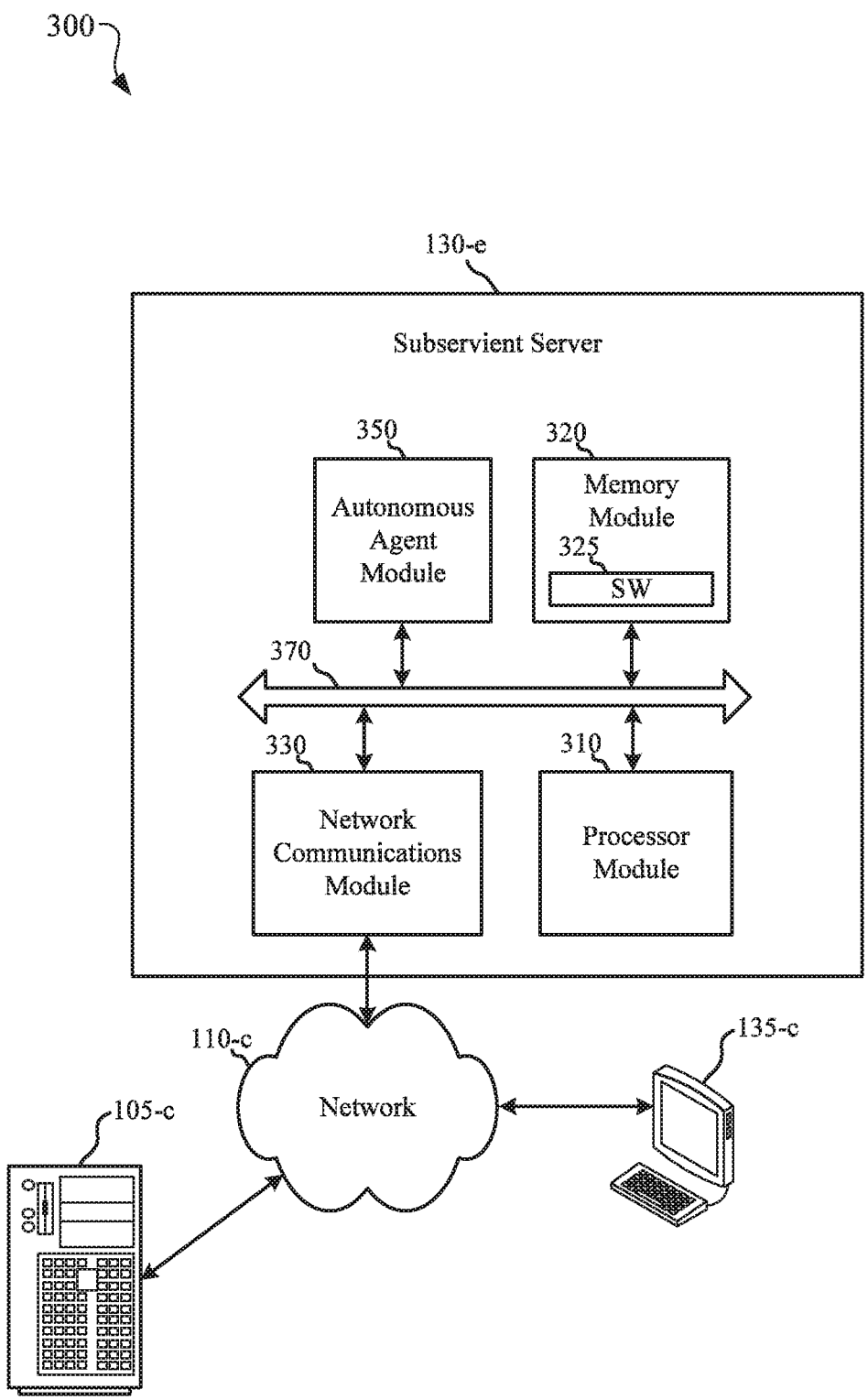
FIG. 3A illustrates an example system that supports server orchestration and autonomous server agents in accordance with the present disclosure.

Turning next to FIG. 3A, shown is a system 300 configured for central server management in accordance with various embodiments. The system 300 may be an example of the systems 100, 100-a, or 200 described with reference to FIGS. 1A, 1B, and 2. The system 300 includes a subservient server 130-e in communication with a network 110-c. The subservient server 130-e may be controllable by a user control terminal 135-c via the supervisory server 105-c and the network 110-c.

The subservient server 130-e may include a processor module 310, a memory module 320 (including software/firmware (SW) 325), a network communications module 330, and/or an autonomous agent module 350. Each of the modules may be in communication with one another via one or more buses 370.

The network communications module 330 may be configured for secure, bi-directional communication with the network 110-c via one or more wired or wireless links. In some embodiments, the network communications module 330 includes a modem configured to modulate packets and transmit them to the network 110-c, and to demodulate packets received from the network 110-c. The network communications module 330 may, for instance, include a transceiver and antennas.

The memory module 320 may include random access memory (RAM) or read-only memory (ROM) or both. The memory module 320 may store computer-readable, computer-executable software/firmware code 325 containing instructions that are configured to, when executed, cause the processor module 310 to perform various functions described herein (e.g., orchestrating server management tasks, communicating with autonomous agents, identifying and responding to security threats, managing exchanges within a script marketplace, etc.). In other examples, the software/firmware 325 is not directly executable by the processor module 310, but is configured to cause a computer (e.g., when compiled and executed) to perform the functions described herein. The processor module 310 may include an intelligent hardware device, e.g., a central processing unit (CPU), a microcontroller, an application-specific integrated circuit (ASIC), or the like. The various functions of the modules of the autonomous agent module 350, described below, may be implemented as an aspect of the processor module 310 or as processor-executable instructions stored on the memory 320.

The autonomous agent module 350 may be configured with one more autonomous agents (e.g., an autonomous agent 175 of FIG. 1B). The autonomous agent module 350, or agents within the module may be configured to receive commands, which may be via scripts, from the supervisory server 105-c. The autonomous agent module 350 may thus be configured to execute server tasks on the subservient server 130-e according to the commands or scripts.

The autonomous agent may, as discussed above, accept and execute virtually any command or group of commands supported by the operating system of the subservient server 130 where the agent resides. The autonomous agent may execute commands irrespective of connectivity to a supervisory server 105.

In some embodiments, an autonomous agent 175 (FIG. 1B) may be installed on some or all of the subservient servers 130 of a system, including, for example, at the autonomous agent module 350 of subservient server 130-*d*. The autonomous agent may register with the supervisory server 105-*c*. Once, registered, a secure communication mechanism (e.g., a connection employing TSL protocol) may be established between the autonomous agent and the supervisory server 105-*c*. The supervisory server 105-*c* may send commands, scripts, or tasks to the agent via the secure connection, and the agent may send results of attempted or executed task to the supervisory server 105-*c* via the secure connection.

Figure 3B:
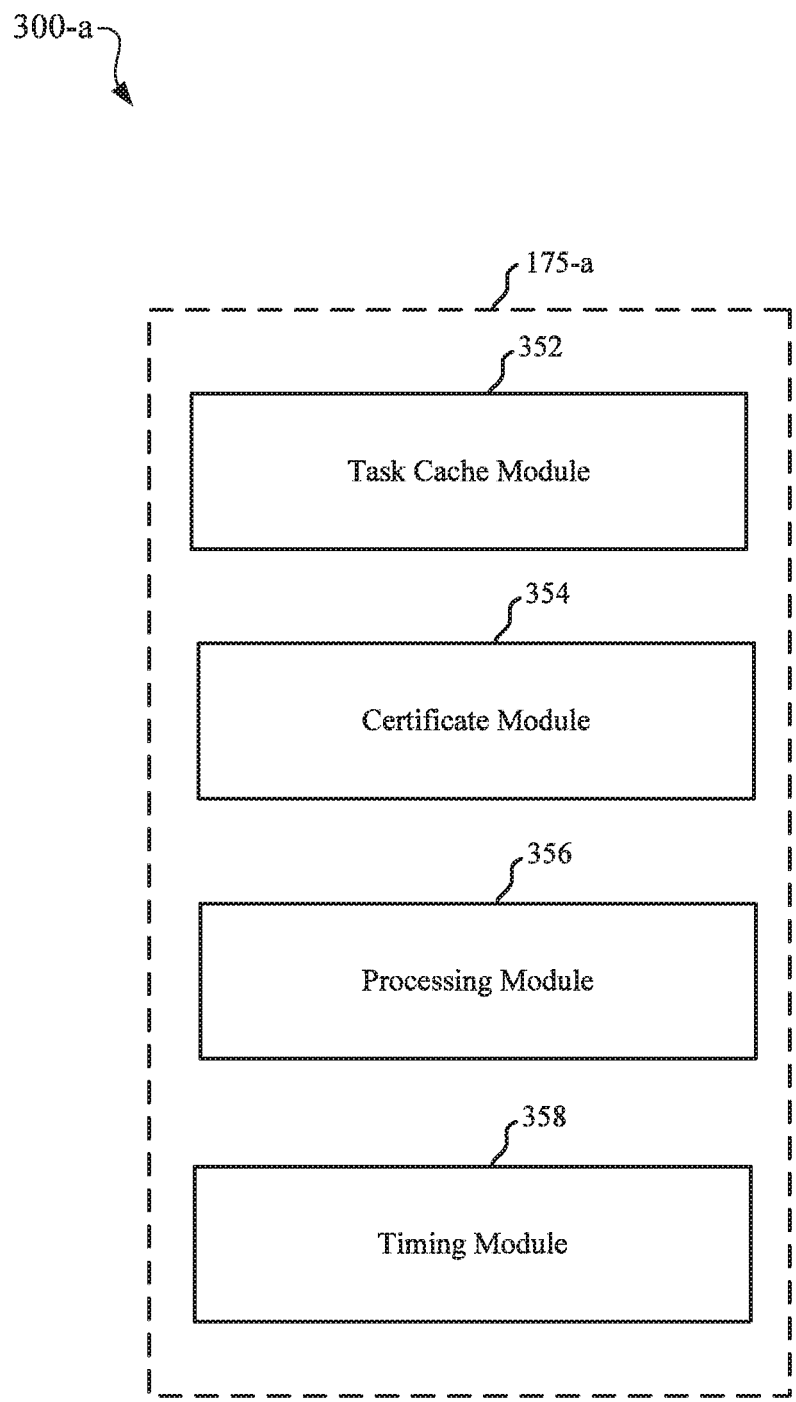
FIG. 3B illustrates an example server agent that supports server orchestration in accordance with various aspects of the present disclosure.

FIG. 3B depicts a block diagram 300-*a* of an autonomous agent 175-*a* in accordance with various embodiments. The autonomous agent 175-*a* may be an example of the autonomous agents 175 described with reference to FIG. 1B. The autonomous agent 175-*a* may be deployed on a subservient server, such as on the autonomous agent module 350 of the subservient server 130-*d* of FIG. 3A.

The autonomous agent 175-*a* may include a task cache module 352, a certificate module 354, a processing module 356, and/or a timing module 358. Each of these modules may be in communication with one another. In some embodiments, each of these modules are represented in processor-executable instructions stored in memory, such as the memory module 320 of FIG. 3A.

The task cache module 352 may be configured to register one or more server management tasks. For example, the supervisory server 105-*c* (FIG. 3A) may transmit a server task to the autonomous agent 175-*a*, and the task may be registered in the task cache module 352. Tasks may be registered when a server script or command is executed at the supervisory server 105-*c*. In some embodiments, the task is sent via a secure connection with the supervisory server 105-*c*, and the security of the connection is verified and/or authenticated by a certificate or key stored within the autonomous agent 175-*a*. The certificate module 354 may be configured to store such a certificate or key, and it may be configured to verify the authenticity of the supervisory server 105-*c*.

The processing module 356 may be configured to execute one or more server management tasks on the subservient server 130-*e* (FIG. 3A). The processing module 356 may execute tasks registered with the autonomous agent 175-*a* and stored within the task cache module 352 irrespective of connectivity between the autonomous agent 175-*a* and the supervisory server 105-*c*. In some embodiments, the processing module 356 may be configured to determine additional tasks to execute based on executing an initial server management task. The processing module 356 may execute such additional tasks irrespective of connectivity with the supervisory server 105-*c*.

In some embodiments, the processing module 356 is configured to identify execution of a server management task of another agent 175 installed on another server 130. The processing module 356 may also be configured to execute an initial server management task on the subservient server 130-*e* (FIG. 3A) with the autonomous agent 175-*a* based on identifying a task executed on another agent 175, and irrespective of connectivity between the autonomous agent 175-*a* and the supervisory server 105-*c*.

In some embodiments, the task cache module 352 may be configured to register several server management tasks, and the processing module 356 may be configured to execute the tasks according to a schedule or on an ad hoc basis and irrespective of connectivity between the autonomous agent and the supervisory server. The timing module 358 may be configured to direct the processing module 356 to execute scheduled tasks within a user-defined time period and/or upon expiration of a timer. For example, a predicate task or command may initiate a timer, the expiration of which may trigger a subsequent task.

Figure 4:
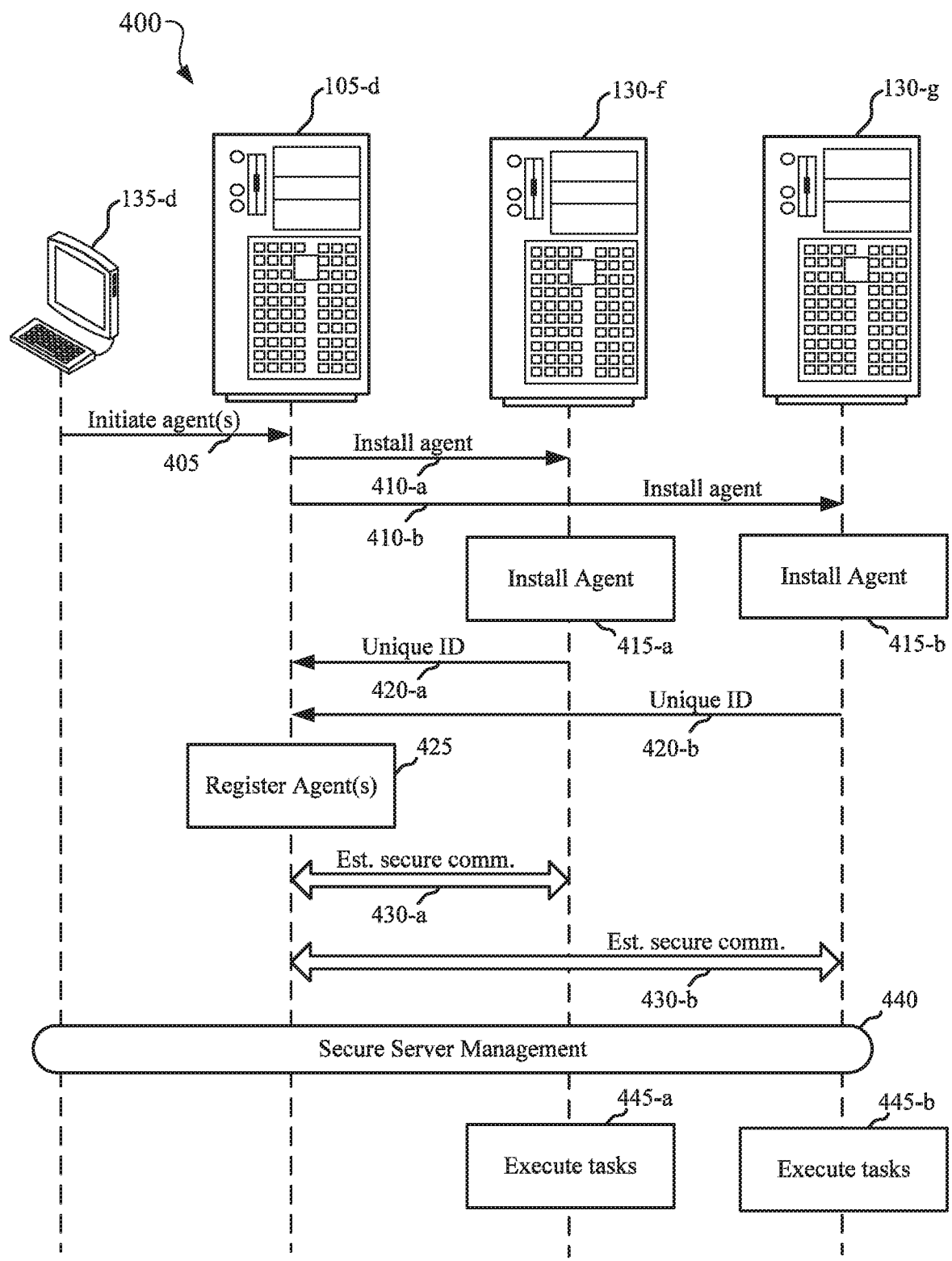
FIG. 4 illustrate an example process flow within a network that supports server orchestration and autonomous server agents in accordance with various aspects of the present disclosure.

FIG. 4 is a call flow diagram 400 depicting communication within a centrally managed server system in accordance with various embodiments. A user, via a user console 135-*d*, may be in communication with a supervisory server 105-*d* and subservient servers 130-*f* and 130-*g*. Each of these may be examples of corresponding consoles and servers described with reference to the preceding figures.

The user may initiate agent deployment 405 by accessing the supervisory server 105-*d*. The supervisory server may install agents 410 by transmitting them to subservient servers 130. The agents may thus be installed 415 on the subservient servers 130. Once installed, the subservient servers 130 may transmit a unique identifier for each agent and the agents may be registered 425 with the supervisory server 105-*d*. Upon registration, a secure communication link 430 may be established between the supervisory server 105-*d* and each of the subservient servers 130. Upon establishing a secure connection link 430, a user may securely manage 440 the subservient servers 130 via the supervisory server 105-*d*. The user may thus cause the subservient servers 130 to execute tasks 445 by, for example, writing and executing scripts via the supervisory server 105-*d*.

Figure 5:
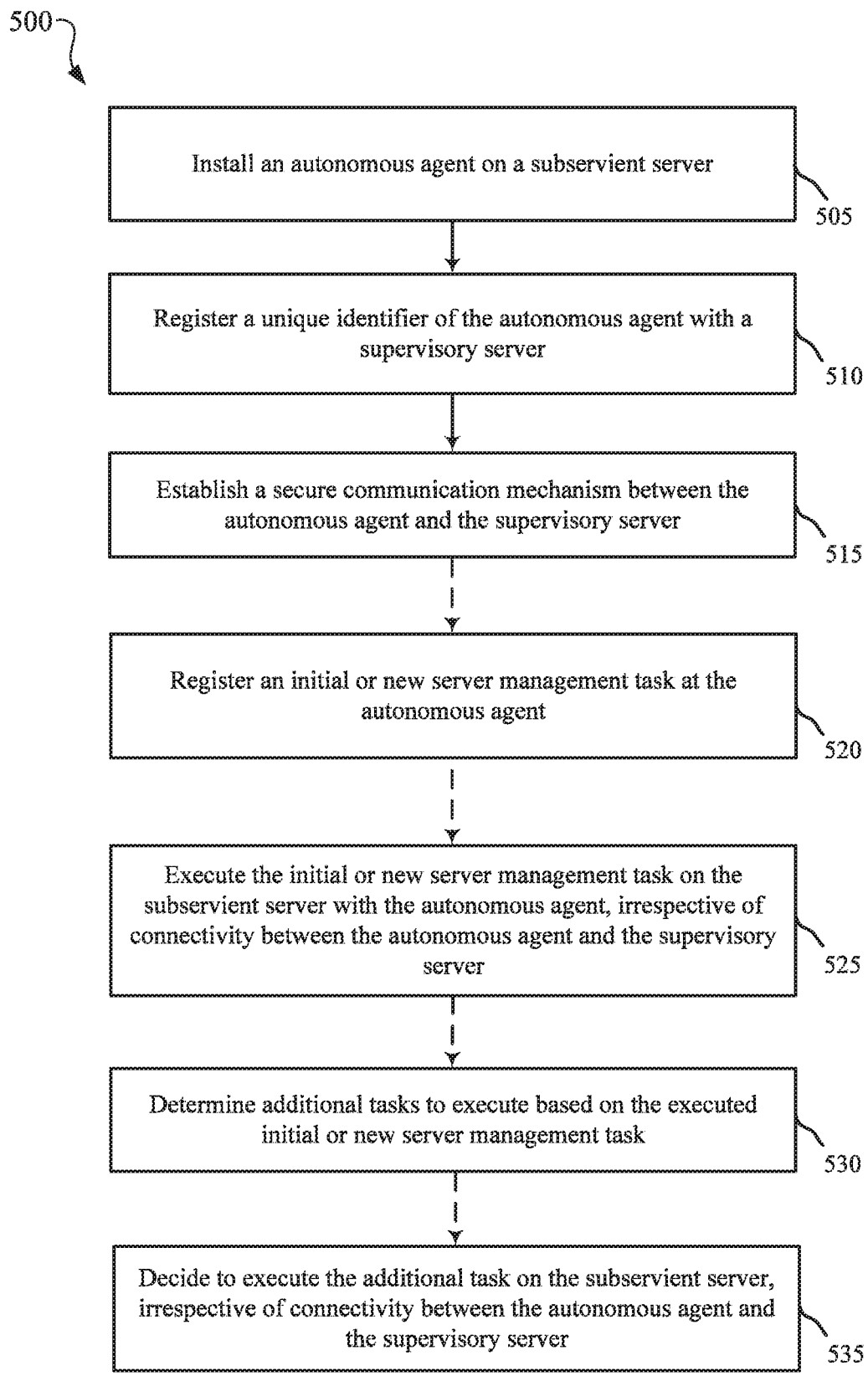
FIGS. 5-7 illustrate an example method or methods of server orchestration with autonomous server agents in accordance with various aspects of the present disclosure.

Next, in FIG. 5, a flow diagram depicts a method 500 for centrally managing a server system in accordance with various embodiments. The method 500 may be implemented by the supervisory servers 105 and/or the subservient servers 130 described in the preceding figures. For example, various aspects of the method 500 may be preformed by one or more of the modules of the supervisory server 105-*b* of FIG. 2. Additionally or alternatively, various aspects of the method 500 may be performed by one or more of the modules of the subservient server 130-*d*.

At block 505, the method 500 may include installing an autonomous agent on a subservient server. At block 510, it may include registering a unique identifier of the autonomous agent with the supervisory server. At block 515, it may involve establishing a secure connection mechanism between the autonomous agent and the supervisory server. In some embodiments, the secure connection mechanism may employ a TLS protocol. Additionally or alternatively, the supervisory server may be a cloud-hosted server.

The method 500 may further include, at block 520, registering an initial or new server management task at the autonomous agent, and, at block 525, the method may involve executing the initial or new server management task on the subservient server with the autonomous agent, irrespective of connectivity between the autonomous agent and the supervisory server.

At block 530, the method 500 may include determining additional tasks to execute based on the executed initial or new server management task. At block 535, the method may further include deciding to execute the additional task on the subservient server, irrespective of connectivity between the autonomous agent and the supervisory server.

Figure 6:
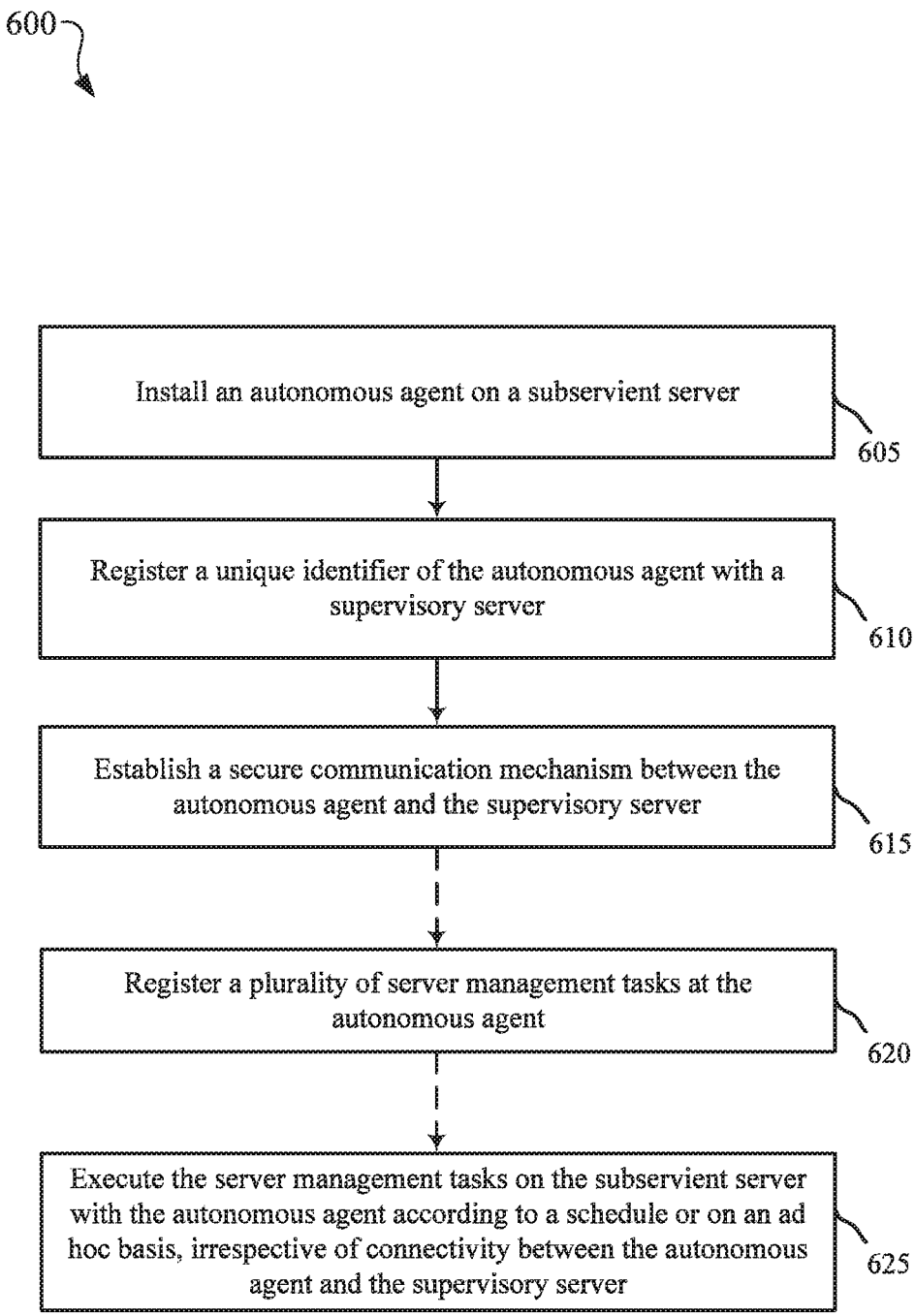

FIG. 6 is a flow diagram that depicts a method 600 for centrally managing a server system in accordance with various embodiments. The method 600 may be implemented by the supervisory servers 105 and/or the subservient servers 130 described in the preceding figures. For example, various aspects of the method 600 may be preformed by one or more of the modules of the supervisory server 105-*b* of FIG. 2. Additionally or alternatively, various aspects of the method 600 may be performed by one or more of the modules of the subservient server 130-*d*. The method 600 may be an example of the method 500.

At block 605, the method 600 may include installing an autonomous agent on a subservient server. At block 610, it may include registering a unique identifier of the autonomous agent with the supervisory server. At block 615, it may involve establishing a secure connection mechanism between the autonomous agent and the supervisory server.

At block 620, the method 600 may further include registering a plurality of server management tasks at the autonomous agent. At block 625, the method may involve executing the server management tasks on the subservient server with the autonomous agent according to a schedule or on an ad hoc basis, irrespective of connectivity between the autonomous agent and the supervisory server.

Figure 7:
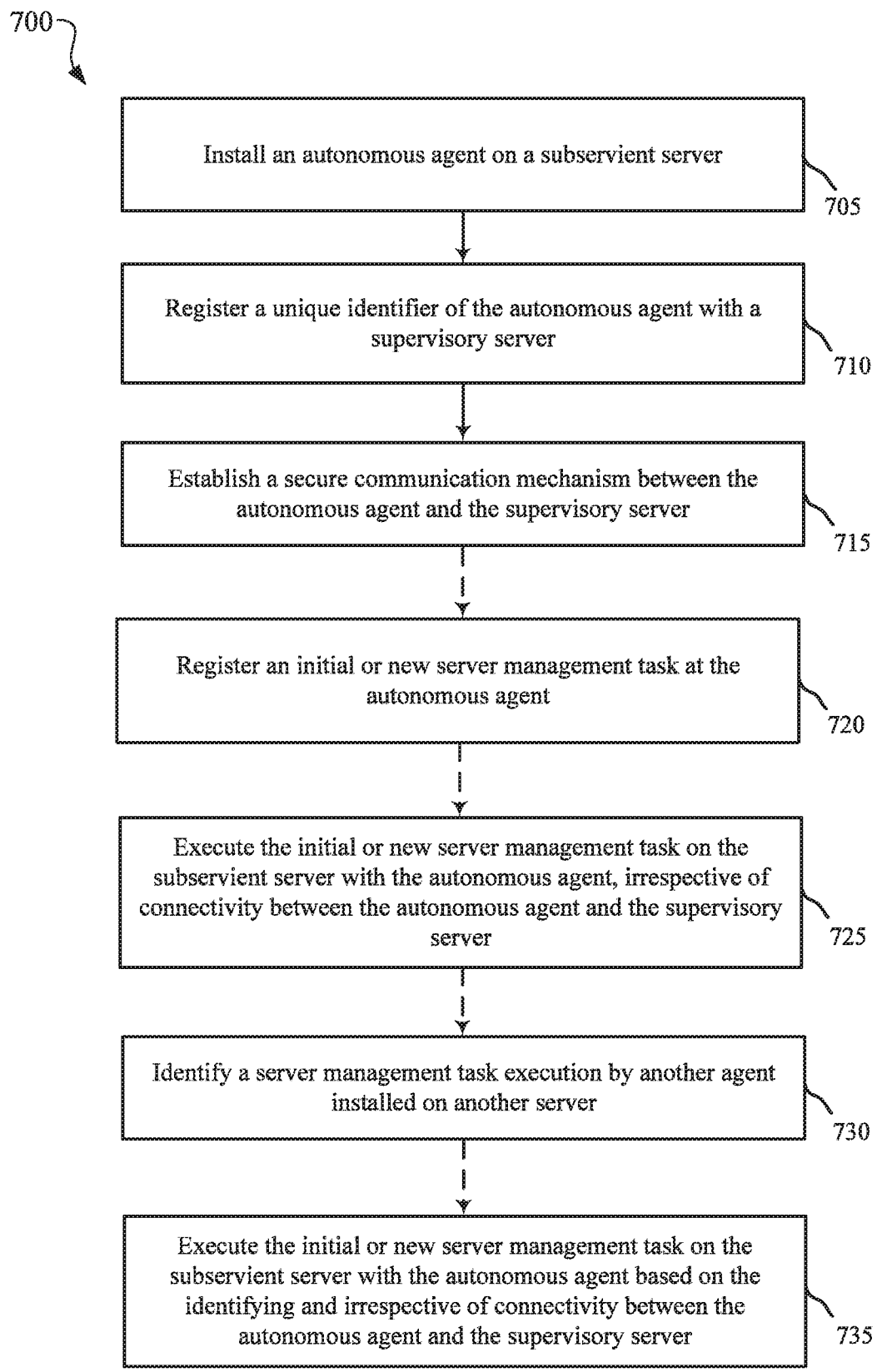

FIG. 7 is a flow diagram that depicts a method 700 for centrally managing a server system in accordance with various embodiments. The method 700 may be implemented by the supervisory servers 105 and/or the subservient servers 130 described in the preceding figures. For example, various aspects of the method 700 may be preformed by one or more of the modules of the supervisory server 105-*b* of FIG. 2. Additionally or alternatively, various aspects of the method 700 may be performed by one or more of the modules of the subservient server 130-*d*. The method 700 may be an example of the method 500 and/or the method 600.

At block 705, the method 700 may include installing an autonomous agent on a subservient server. At block 710, it may include registering a unique identifier of the autonomous agent with the supervisory server. At block 715, it may involve establishing a secure connection mechanism between the autonomous agent and the supervisory server.

At block 720, the method 700 may further include registering an initial or new server management task at the autonomous agent. At block 725, the method may involve executing the initial or new server management task on the subservient server with the autonomous agent, irrespective of connectivity between the autonomous agent and the supervisory server.

In some embodiments, the method 700 includes, at block 730, identifying a server management task execution by another agent installed on another server. At block 735, the method may also include executing the initial or new server management task on the subservient server with the autonomous agent based on identifying the execution by the other agent and irrespective of connectivity between the autonomous agent and the supervisory server.

It should be noted that the methods, systems and devices discussed above are intended merely to be examples. Various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory," "memory unit," or "memory module," may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, non-transitory, portable or fixed storage devices, optical storage devices, wireless channels, a SIM card, other smart cards, and various other mediums capable of storing, containing or carrying instructions or data.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory, computer-readable medium. Other examples and implementations are within the scope and spirit of the disclosure and appended claims. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (e.g., A and B and C).

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for server management, comprising:
registering, at a first server, a unique identifier of an agent running on a second server;
establishing a secure connection between the agent and the first server based at least in part on the registering;
receiving, at the agent, a server management task to manage the second server based at least in part on establishing the secure connection, the server management task comprising a command that an operating system of the second server supports, wherein the server management task is a disk space management task, a log monitoring task, a system configuration task, an email communication task, a security threat identification task, a security threat neutralization task, a user management task, or any combination thereof; and
accepting, at the agent, the server management task.

2. The method of claim 1, further comprising:
executing the server management task on the second server with the agent.

3. The method of claim 2, wherein the secure connection between the agent and the first server is lost, and wherein the server management task is executed after or while the secure connection is lost.

4. The method of claim 2, further comprising:
determining an additional task to execute based at least in part on executing the server management task; and
executing the additional task on the second server.

5. The method of claim 4, wherein the secure connection between the agent and the first server is lost, and wherein at least one of the server management task or the additional task is executed after or while the secure connection is lost.

6. The method of claim 1, wherein accepting the server management task comprises executing a server script comprising the command associated with the server management task.

7. The method of claim 1, further comprising:
identifying another server management task execution by another agent installed on another server; and
executing the server management task on the second server with the agent based at least in part on the identifying.

8. The method of claim 7, wherein the secure connection between the agent and the first server is lost, and wherein the server management task is executed after or while the secure connection is lost.

9. The method of claim 1, wherein the receiving comprising receiving a plurality of server management tasks that includes the server management task, the method further comprising:
accepting, at the agent, the plurality of server management tasks; and
executing the plurality of server management tasks on the second server with the agent according to a schedule or on an ad hoc basis.

10. The method of claim 9, wherein the secure connection between the agent and the first server is lost, and wherein at least one of the plurality of server management tasks is executed after or while the secure connection is lost.

11. The method of claim 1, wherein the secure connection comprises a transport layer security (TLS) protocol, wherein the first server comprises a cloud-hosted server, or both.

12. A system to manage servers, comprising:
a first hardware-implemented server that manages tasks on a second hardware-implemented server that has a network connection to the first hardware-implemented server; and
an agent on the second hardware-implemented server, wherein a unique identifier of the agent is registered at the first hardware-implemented server and a secure connection is established between the agent and the first hardware-implemented server, the agent configured to receive and accept a server management task to manage the second hardware-implemented server, the server management task comprising a command that an operating system of the second hardware-implemented server supports, wherein the server management task is a disk space management task, a log monitoring task, a system configuration task, an email communication task, a security threat identification task, a security threat neutralization task, a user management task, or any combination thereof.

13. The system of claim 12, further comprising:
a console that provides access to the first hardware-implemented server for management of the second hardware-implemented server via the agent.

14. The system of claim 13, further comprising:
a third hardware-implemented server, wherein the first hardware-implemented server manages tasks on the third hardware-implemented server;
a second agent on the third hardware-implemented server, wherein the console provides access to the first hardware-implemented server for management of the third hardware-implemented server via the second agent.

15. The system of claim 12, wherein the agent comprises:
a task cache module that accepts one or more tasks in response to a script or a second command executed at the first hardware-implemented server.

16. The system of claim 15, wherein the agent comprises:
a processing module that executes the tasks accepted by the task cache module, wherein the processing module is in communication with the task cache module, and
a timing module that directs the processing module to execute the tasks accepted by the task cache module within a time period, upon expiration of a timer, or both.

17. The system of claim 12, wherein the first hardware-implemented server comprises:
a server orchestration module that manages, schedules, or executes tasks on the second hardware-implemented server.

18. The system of claim 17, wherein the first hardware-implemented server comprises:
a command execution module that executes commands utilizing the agent based at least in part on an output of the server orchestration module, and
a scheduler module that executes tasks according to a schedule based at least in part on the output of the server orchestration module.

19. The system of claim 12, wherein the first hardware-implemented server comprises:
a user management module that stores user credentials, user preferences, a location of the second hardware-implemented server, or any combination thereof, wherein the user management module is in communication with a hardware-implemented data store.

20. The system of claim 12, further comprising:
a hardware-implemented data store in communication with the first hardware-implemented server, wherein the hardware-implemented data store comprises content, scripts, tasks, event logs, or user data, or any combination thereof.

\* \* \* \* \*